Dec. 22, 1964  G. W. BALZ  3,161,993
FINISHING APPARATUS AND METHOD

Filed Nov. 12, 1963  8 Sheets-Sheet 1

INVENTOR.
GUNTHER W. BALZ
BY
ATTORNEY

Dec. 22, 1964  G. W. BALZ  3,161,993
FINISHING APPARATUS AND METHOD
Filed Nov. 12, 1963  8 Sheets-Sheet 2

INVENTOR.
GUNTHER W. BALZ
BY
ATTORNEY

Dec. 22, 1964  G. W. BALZ  3,161,993
FINISHING APPARATUS AND METHOD
Filed Nov. 12, 1963  8 Sheets-Sheet 3

INVENTOR.
GUNTHER W. BALZ
BY
*Gordon W. Huercken*
ATTORNEY

Dec. 22, 1964    G. W. BALZ    3,161,993
FINISHING APPARATUS AND METHOD
Filed Nov. 12, 1963    8 Sheets-Sheet 4

INVENTOR.
GUNTHER W. BALZ
BY
ATTORNEY

INVENTOR.
GUNTHER W. BALZ

Dec. 22, 1964 G. W. BALZ 3,161,993
FINISHING APPARATUS AND METHOD
Filed Nov. 12, 1963 8 Sheets-Sheet 6

INVENTOR.
GUNTHER W. BALZ
BY
ATTORNEY

Dec. 22, 1964  G. W. BALZ  3,161,993
FINISHING APPARATUS AND METHOD
Filed Nov. 12, 1963  8 Sheets-Sheet 7

INVENTOR.
GUNTHER W. BALZ
BY
*Gordon W. Hueschen*
ATTORNEY

Dec. 22, 1964     G. W. BALZ     3,161,993
FINISHING APPARATUS AND METHOD

Filed Nov. 12, 1963     8 Sheets-Sheet 8

INVENTOR.
GUNTHER W. BALZ
BY
*Gordon W. Dueschen*
ATTORNEY

3,161,993
FINISHING APPARATUS AND METHOD
Gunther W. Balz, Kalamazoo, Mich., assignor to Roto-Finish Company, Kalamazoo, Mich., a corporation of Michigan
Filed Nov. 12, 1963, Ser. No. 323,004
49 Claims. (Cl. 51—163)

The present invention relates to finishing machines, and is more particularly concerned with a finishing machine having a construction whereby the finishing medium and parts or work pieces to be finished are transported vertically during the finishing process, whereby the finishing medium is automatically separated from the finished parts, and whereby the parts are automatically discharged upon the completion of a desired finishing operation without the necessity for rotating or otherwise moving the finishing apparatus or a housing thereof.

Finishing machines may be of several different types. With regard to the mode of operation, there are tumbling type machines and vibratory type machines, the latter being a finishing machine in which a vibration generating means, e.g., a rotary motor provided with eccentric members, is employed for imparting alternating waves of energy to a finishing, e.g., abrading, chamber for moving a mass of finishing media and unfinished parts therein. In addition, self-separating vibratory finishing machines are now available which employ integral foraminous members for automatically separating finishing media from finished parts upon rotation of a housing from a finishing position to a transfer position. When so rotated, the finishing media flows through openings in the foraminous member and is deposited in a storage chamber whereas the finished parts are discharged from the housing or transferred to a succeeding stage, depending upon whether the device is of single or multistage construction. Such devices and other advanced types of vibratory finishing devices are exemplified by those disclosed and claimed in U.S. Patents 3,073,078, 3,073,079, 3,073,080, 3,073,069, 3,073,082, 3,073,081, 3,093,940 and 3,071,900.

Although the apparatus disclosed and claimed in the above-enumerated patents accomplishes the desired results including finishing, separation, and medium return to a satisfactory degree, all of the self-separating devices have the limitation that, in order to separate the finishing medium and discharge the finished parts, the entire housing or abraiding chamber of the apparatus must be rotated or tilted through a substantial arc. The need for additional equipment to accomplish this rotation materially increases the cost of the apparatus and in some cases also places restrictive limits on the size of the apparatus. It would therefore be highly desirable to have available a device in which separation of finishing material from finished parts after a completed work cycle and return of the finishing material to the finishing chamber of the device could be effected without rotation or elevation of a housing or finishing chamber and with a minimum of unnecessary motion and energy.

When the same or different type parts are to be finished, it is sometimes necessary or desirable that different sizes or types of finishing media be employed. Moreover, it is periodically necessary to replace spent finishing material. With some existing vibratory finishing machines, to discharge media, it is necessary to rotate the housing or finishing chamber to dump the finishing media therefrom. In certain self-separating finishing machines, a recloseable opening is provided in the storage chamber through which the finishing media may be discharged by appropriate rotation of the housing. Although satisfactory, the down-time involved in changing the finishing media in self-separating finishing machines reduces the utility factor thereof since a container must be placed below or in front of the housing, the housing must be rotated or vibrated in order to discharge the finishing media into the container, and the filled container must be removed, the opening reclosed, and the device recharged with fresh medium before the finishing machine can be operated. In other so-called multistage devices, various grades of finishing medium are employed in different chambers, but at a minimum a rotation of the chamber is required to convey the parts to be finished from one chamber to the other. It would be desirable, therefore, to provide a finishing machine whereby a first grade of finishing medium could be automatically separated from the parts to be finished and each successive grade of finishing material automatically introduced without the need for discontinuing the operation.

It is accordingly an object of the present invention to provide an improved finishing machine which overcomes the stated disadvantages of existing machines. Another object of the invention is to provide an improved finishing machine from which finishing media and/or finished parts may be quickly and conveniently discharged. It is a prime object to provide a finishing machine which accomplishes the above stated objects, including finishing, parts separation, and medium recycle, without the necessity for rotating the machine housing. It is another object of the invention to provide a new and improved process whereby these results are accomplished. An additional object is to provide such a process in which the parts and finishing medium are subjected to vibration not only to effect finishing of the parts, but also to cause the mass of parts and solid finishing medium to attain a vertical elevation by means of the vibrations, whereby the separation of parts and medium is effected in a separation stage after completion of a suitable finishing stage, and whereby the separated medium is returned by means of gravity to the finishing stage of the process. Another object of the invention is the provision of apparatus wherein such a process can be conveniently carried out, whether in continuous, batch or semi-continuous, or multistage manner. Additional objects and advantages will be apparent to one skilled in the art and still other advantages will become apparent hereinafter.

The present invention provides apparatus having a finishing chamber into which the parts to be finished and the finishing medium are introduced initially. Vibrations are then imparted to the mass in such a manner and direction that localized orbital motion is provided to carry out the finishing process and a vertical tranlational motion is provided which results in the parts and finishing medium being carried to or toward the top of the finishing chamber. At this point the parts are either automatically separated from the finishing medium and discharged or, alternatively, returned to the starting point for recycling. The separated finishing material is either discharged separately from the device, or returned to the finishing stage of the process by means of gravity. In a further modification, the finishing chamber may be arranged in the form of a helical trough with a bottom preferably having an arcuate, e.g., a substantially semicircular, cross-section. Suitable vibrations are imparted to the apparatus which causes the parts and finishing medium to vibrate in a localized orbital path and also to travel upward along the trough, with separation and parts discharge automatically taking place at the top of the trough. Still another embodiment is designed for use as a multiple stage apparatus. In such case the helical trough is so arranged that the parts encounter finishing media of various grades as they travel upward. As a result, rough, intermediate, and fine finishing, as well as intermediate grades of finishing, may all be accomplished in one pass through the apparatus, with the finished parts being automatically separated and discharged. Other modifications and embodiments within the scope of the invention will be apparent to one skilled in the art.

The invention in several of its preferred embodiments is illustrated by the accompanying drawings in which.

Reference is now made to the accompanying drawings for a better understanding of the invention, wherein all of the parts are numbered and wherein the same numbers are used to refer to corresponding parts throughout.

Figure 1:
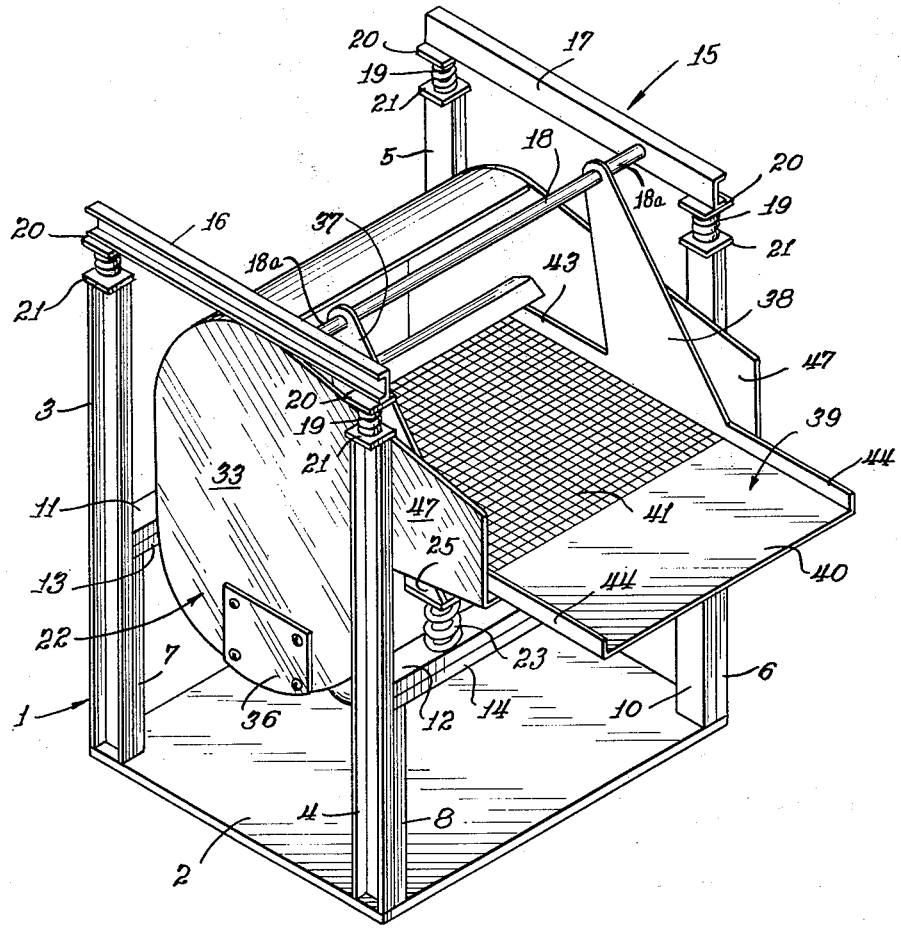
FIGURE 1 is an isometric view of a finishing machine according to the invention.
Figure 2:
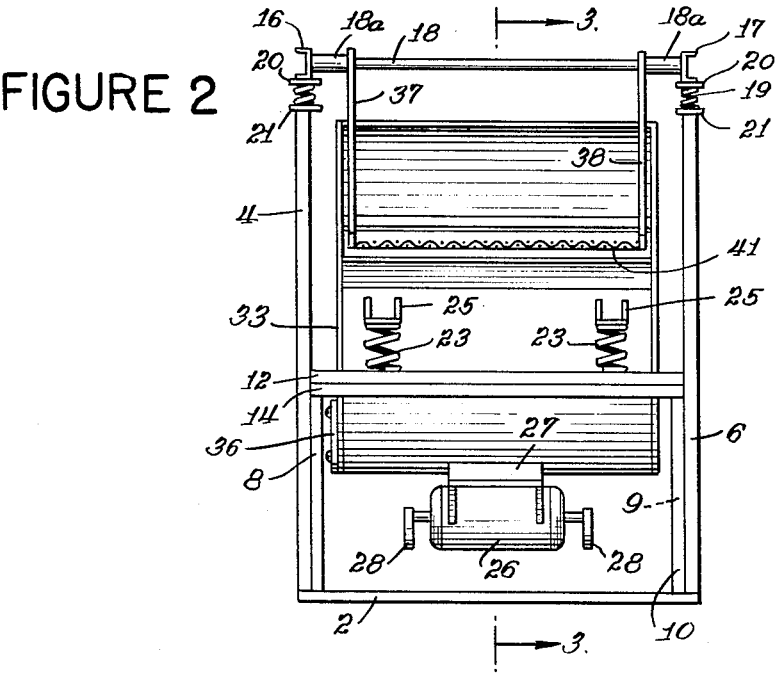
FIGURE 2 is a front elevation of the machine shown in FIGURE 1.
Figure 3:
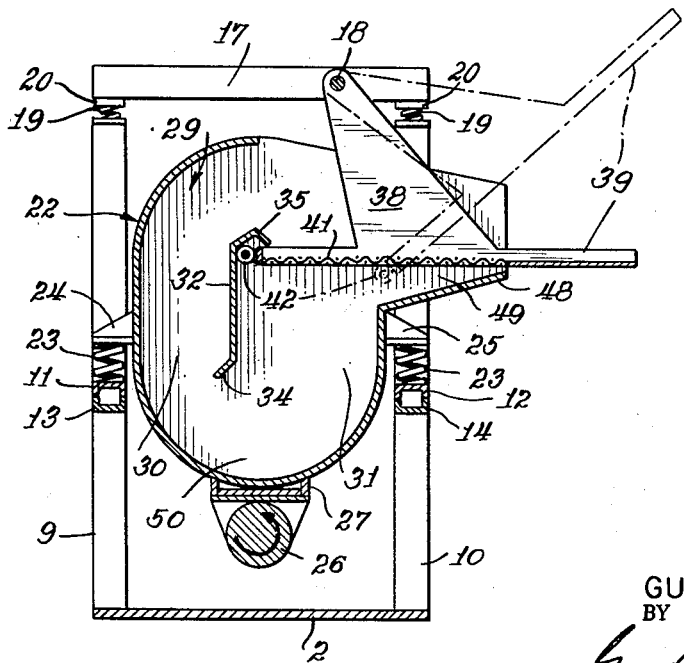
FIGURE 3 is a vertical section taken at the line 3—3 of FIGURE 2.

Referring to FIGURES 1-3, a finishing machine is shown having a frame 1 comprising a base plate 2, vertical supporting members 3, 4, 5, and 6 comprised of steel channels, and vertical supporting members 7, 8, 9, and 10 comprising short steel channels. Horizontal cross members 11, 12, 13, and 14 comprise steel channels in oppositely arranged pairs to form hollow beams. The various parts of the frame may be connected together by any suitable means such as welding. A screen support frame 15 is spring-mounted on the main frame 1 and comprises cross members 16 and 17, each formed from a steel channel, and a horizontal rod 18 affixed at its ends to the cross members. The cross members 16 and 17 are mounted on the frame 1 by means of helical springs 19, the ends of which are affixed to plates 20 and 21 by any suitable means such as welding. The plates 20 are affixed to the cross members 16 and 17 and the plates 21 are affixed to the vertical support members 3, 4, 5, and 6 by any suitable means such as welding. Alternatively, cups adapted to receive the spring ends may be affixed to the frame members. A generally cylindrical housing 22 having a bottom substantially arcuate in cross-section is spring-mounted on the frame 1 by means of helical springs 23. The helical springs 23 are affixed at one end, as by welding, to the cross members 11 and 12, and at the other end to brackets 24 and 25 which are in turn affixed to the housing 22. A vibration generating means, such as a vibratory motor 26, is affixed to the housing 22 by means of a motor mounting bracket 27 and suitable bolts and nuts. The connections to the motor 26 are not shown since they are conventional. In order to generate orbital vibrations, conventional eccentric weights 28 are mounted on the motor shaft, the vibrations then being transmitted to the housing 22.

The chamber defined by the housing 22 is divided generally into two intercommunicating portions comprising a posterior ascending chamber 30 and an anterior descending chamber 31 by a vertical partial septum 32 which is affixed at its ends to the end walls 33 of the housing 22. The lower edge 34 of the septum 32 is angled rearwardly in the direction of the ascending chamber 30, and the upper edge 35 of the septum is angled first forwardly and then downwardly to guide the chamber contents over the end of the discharge baffle 39. A chip removal door 36 is affixed to one end wall 33 as by bolts, and may be removed periodically to withdraw fines, chips, and used finishing medium.

The discharge assembly is comprised of lateral brackets 37 and 38 affixed at their edges to a discharge baffle 39 and pivotally supported at their upper ends by a rod 18 which is journaled through holes provided near the ends of the brackets 37 and 38. Sleeves 18a space the brackets 37 and 38 in proper position. The discharge baffle 39 is comprised of a discharge tray 40 and a separatory foraminous member in the form of a screen 41. A bumper 42 is provided in the form of a rubber roll mounted on a shaft. The lateral brackets 37 and 38 are provided with forward and rearward extensions to act as guides 43 and 44. The end walls 33 of the housing 22 are provided with extensions 47 which cooperate with a bottom extension 48 to define a mouth, chute, or receptacle 49, through which the chamber may be loaded and unloaded. The bottom extension 48 preferably declines rearwardly to cause material deposited thereon to slide into the bottom of the chamber 29. In FIGURE 3 the discharge assembly is shown in solid lines in the discharge position and in broken lines in the finishing position.

To place the apparatus in operation, the discharge assembly is first located in the position shown by the broken lines in FIGURE 3. The parts to be finished and the loose granular or particulate solid finishing medium are then charged through the receptacle and into the receiving zone 50 at the bottom of the housing 22. To enable the mass to rise sufficiently high in the ascending chamber to clear the top of the septum and fall into the descending chamber, a sufficient mass of parts and finishing media should be maintained in the housing. Normally, filling the housing approximately two-thirds to three-fourths full is satisfactory. However, the exact quantity is not extremely critical and may be varied considerably depending upon the type of parts and finishing medium used, the rate and magnitude of the vibration applied, and the like. When the vibratory motor 27 is energized, it rotates in the direction shown by the arrow in FIGURE 3. The parts and finishing medium are thereby caused to move in localized orbital paths, whereby the finishing operation is accomplished by the relative motion between the parts and finishing medium. In addition to the localized orbital motion, a translatory motion is imparted to the mass as a result of the particular direction of rotation of the vibratory motor and the arrangement of the septum, causing the mass comprising parts and finishing medium to be forced gradually upward from the receiving zone 50 into the ascending chamber 30 of the housing 22. The mass continues to move upwardly until it is directed over the upper angled portion 35 of the septum and gravitates through the descending chamber 31 to the receiving zone 50 of the housing 22, whence the cycle described is repeated. The recycling process is continued until the parts have attained the desired degree of finish. The discharge assembly is then placed in the position shown by the solid lines in FIGURE 3. Thereafter, as the parts and finishing medium are forced up and over the upper edge of the baffle, they are deposited on the separatory foraminous member 41. The size of the foramina is so chosen that the finishing material passes therethrough and is returned by gravity to the receiving zone, while the parts are retained on the surface of the foraminous member. Continued vibration causes the parts to travel along foraminous member 41 and discharge tray 40 and to collect in a suitable receptacle at the end of the tray. Covering of the foraminous member with a suitable plate permits removal of finishing material in the same manner, although not all can be thus removed.

For replacement of one finishing medium with another, the new medium may be introduced and the vibratory means energized with the foraminous member in position. By proper selection of mesh size, if desired together with a solid deck and exit means, either coarser or finer medium can be added and will automatically replace the medium already in the device.

Figure 4:
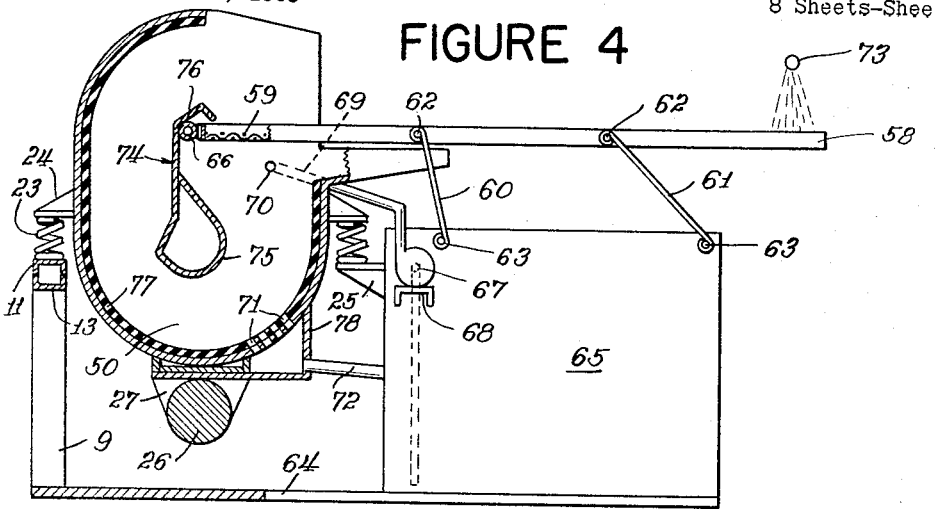
FIGURE 4 is a vertical section of a somewhat modified embodiment of the machine shown in FIGURES 1-3.

In the embodiment of FIGURE 4, the basic portion of the apparatus is similar to that of FIGURES 1–3. However, the discharge assembly comprises a discharge tray 58 and foraminous member 59 supported by hinged spring straps 60 and 61 pivotally attached at their ends to hinge pins 62 affixed to the tray and hinge pins 63 affixed to the sides of tank 65. Straps 61 have a greater length than straps 60. Therefore, when member 59 is retracted, the end of foraminous member 59 and bumper 66 are lowered to clear the upper end 76 of septum 74.

A liquid circulating means is provided for circulation of liquid through the finishing chamber to facilitate the finishing process and remove fines and sludge generally. The apparatus is mounted on base plate 64 and comprises a tank 65 designed to contain a liquid chemical composition. A motor-driven pump 67 having conventional connections, mounted on a bracket 68, is provided with an intake immersed in the liquid. The liquid is pumped into the finishing chamber through a conduit 69 and spray nozzle 70. The liquid cools and accelerates the finishing process and additionally washes out the fines and sludge from the finishing chamber. The liquid, including the fines and sludge, passes through a foraminous member 71, such as a screen having a suitable mesh, while the parts and finishing material of a size which is still useable are retained. The foraminous member 71 is preferably mounted in the wall of the housing near the bottom, and flush with the housing lining 77 of usual type material such as natural or synthetic rubber, e.g., neoprene, polyurethane, or the like, in order not to impede the movement of the finishing mass. The liquid which passes through the foraminous member 71 falls into a receptacle 78 affixed to the housing, and is returned to the tank 65 by means of a discharge conduit 72. While in the tank, the sludge which has been removed from the finishing chamber settles to the bottom, and thus-clarified liquid is recycled to the finishing chamber. The use of a liquid in this manner greatly increases the efficiency of the apparatus. A nozzle 73 is provided to spray water over the emerging parts to remove any coating of sludge or finishing material which adheres thereto. In this embodiment the septum 74 is provided with an arcuate lower edge 75 in the form of a horizontal tube to facilitate orbital circulation of the finishing material and parts being finished. The upper end 76 is similar to that of the embodiment previously described. The pump 67 is preferably inactivated during a separation cycle.

Figure 5:
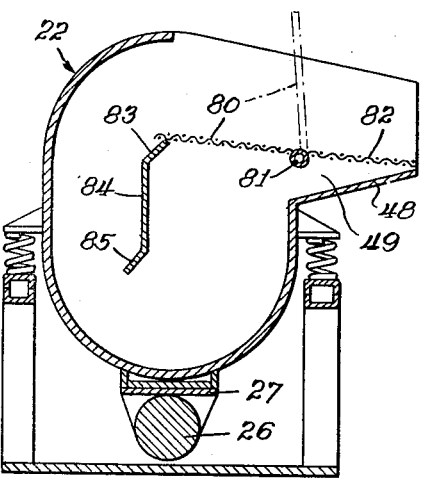
FIGURE 5 is a vertical section of still another embodiment showing a portion of the machine with the supporting frame removed.

FIGURE 5 illustrates a housing portion of a finishing machine, adapted to be mounted for vibration in a frame such as previously described, in which the discharge assembly is comprised of a foraminous member in the form of a hinged screen 80 connected by a hinge 81 to a stationary screen 82 which is in turn affixed to the housing wall. During a normal finishing operation, the hinged screen 80 is maintained in open position folded against the stationary screen 82. When the finishing process is completed and it is desired to discharge the parts, the hinged screen 80 is closed. As the mass of parts and finishing material then passes over the upper edge 83 of the septum 84, it is deposited on the hinged screen 80. The parts are retained on the screen and subsequently discharged, while the finishing material passes through the screen and is returned to the receiving zone by gravity. The lower edge 85 of the septum is contoured similarly to that of the device shown in FIGURES 1–3.

Figure 6:
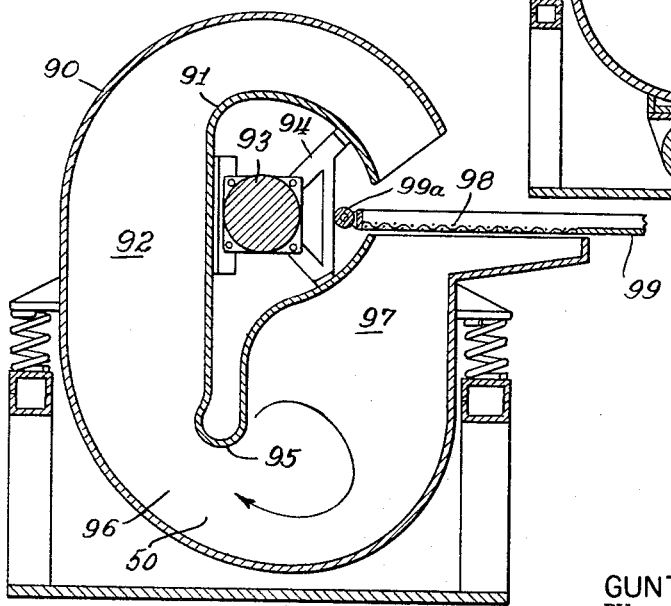
FIGURE 6 is a vertical section of still another embodiment shown without supporting frame.

FIGURE 6 illustrates an embodiment in which the vibratory motor is mounted near the top of the housing. The finishing chamber is defined by an outer housing portion 90 and an inner housing portion 91. Outer walls 92 complete the housing. The vibratory motor 93 is affixed to the inner housing portion 91 by means of a bracket 94. A protuberance 95 formed at the lower portion of the inner housing 91 together with the remainder of the inner housing serves as a septum to separate the chamber formed into an ascending chamber 96 and a descending chamber 97. As a result of the orbital vibration and of the upward component of the vibration, the mass comprising parts and finishing material is elevated along the ascending chamber 96 over the top of the inner housing 91 and into descending chamber 97 when separation screen 98 is in retracted position. At the end of the finishing process, the screen 98 and tray 99 carrying bumper 99a are inserted. The parts and finishing medium are deposited on the screen where the finishing medium is separated by the screen and permitted to return by gravity to the receiving zone 50, whereas the finished parts are transported along the screen by vibratory action and discharged.

In another embodiment, the finishing machines of the present invention may have a structure wherein the finishing chamber comprises a helical trough. In such embodiment a vibratory motor, preferably with unbalanced or out-of-phase eccentric weights, is mounted with its shaft in a vertical position, and preferably but not necessarily caused to rotate in the descending direction of the trough. Parts placed at the bottom of the trough and finishing medium are thus excited to vibrate in an orbital path in a plane substantially perpendicular to the trough. Additionally, a force component imparted by the vibratory motor causes the mass comprising the parts and finishing medium to travel along the inclined trough. As a result of this compound motion, the finishing medium acts upon the parts and, additionally, the entire mass slowly rises along the helical trough.

Figure 7:
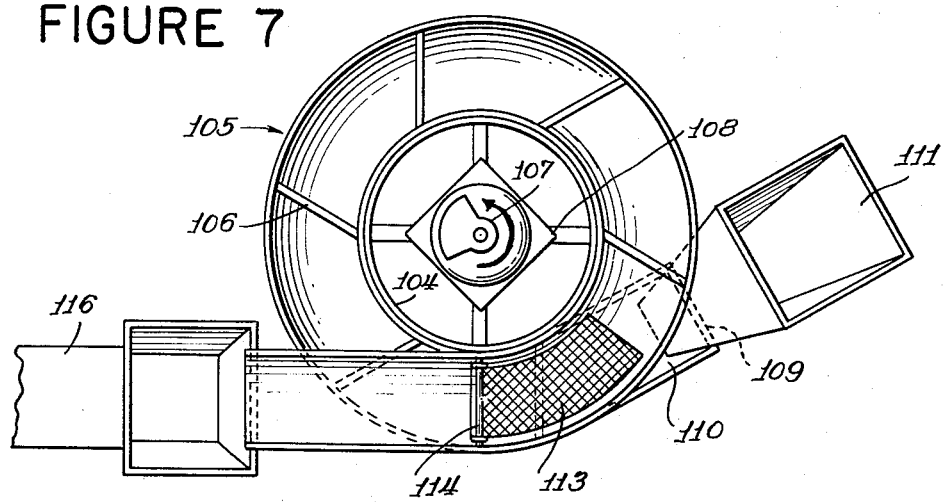
FIGURE 7 is a top view of an embodiment comprising a helical trough abrading chamber.
Figure 8:
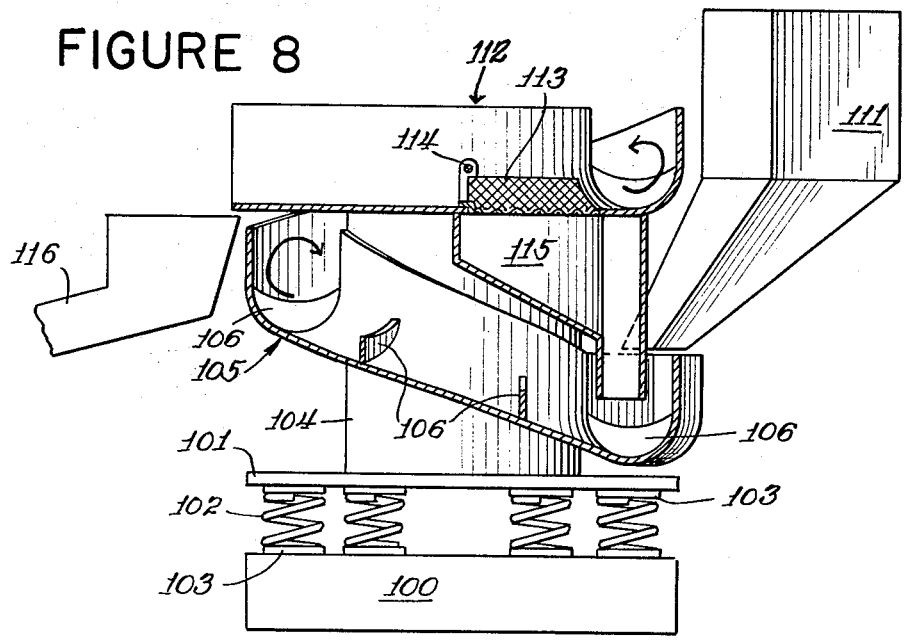
FIGURE 8 is a side elevation partly in cross-section of the embodiment shown in FIGURE 7.

FIGURES 7 and 8 illustrate a helical trough type of finishing machine. The apparatus shown is designed for either batch operation or short cycle continuous operation. The apparatus is mounted on a stationary base 100. A base plate 101 is spring-mounted on the stationary base 100 by means of helical springs 102 which are affixed to plates 100 and 101 by means of small plates or cups 103 which are suitably affixed to base 100 and base plate 101. A frame 104 is affixed to base plate 101. Mounted on the frame is a finishing chamber in the form of a helical trough having an arcuate, e.g., semi-cylindrical, bottom. The helical trough may also be in the form of a tube, but an open trough is ordinarily preferred. A plurality of vanes or baffles 106 can be positioned at intervals to assist and direct the upward movement of the parts and finishing medium, and are required when the vibratory motor 107 carries balanced and rotationally in-phase eccentric weights. The vanes may be omitted when the vibratory motor 107 carries unbalanced eccentric weights, or when the pitch of the helix is suitably limited. Thus, when unbalanced eccentric weights are employed or when the eccentric weights located at opposite ends of the shaft are secured thereto in non-identical rotational positions, the resulting out-of-phase rotation produces a vibratory action which causes the mass of finishing material and parts to progress smoothly upwardly along the inclined helical trough. The vibratory motor 107 is shown mounted to the trough by means of brackets 108. The lowermost end of the trough is provided with end wall 109 defining a receiving zone 110 into which parts and finishing medium may be introduced by suitable storage means such as hopper 111 or by suitable not shown conveying means. Upper end 112 of the trough is provided with screen 113 which is hingedly connected at its forward end to the trough by means of hinge 114. Duct 115 is positioned below the screen area for returning finishing medium (and parts, when the screen is open) to the receiving zone by gravity. A receptacle 116 may be placed beneath the trough end 112 for receiving finished parts as they are discharged therefrom.

The finishing machine is operated by charging parts and finishing medium into receiving zone 110 at the trough bottom. The vibratory motor is then energized and preferably rotates in the direction indicated by the arrow in FIGURE 7. Both the parts and finishing medium move in an orbital path in the direction indicated by the arrows in FIGURE 8. Additionally, the mass moves slowly up the inclined trough. For batch operation, the screen 113 is placed in the open position. Consequently, when the parts and finishing medium reach the resulting opening, they fall through and are returned by the return duct 115 to the receiving zone. When the parts have been finished for a desired period, the screen 113 is closed. Thereafter, as the parts and finishing medium pass over the screen, the finishing medium passes through the screen and is returned to the starting position by the force of gravity. However, the parts are restrained by the screen and continue to travel along the trough until they leave the end of the trough for collection in the receptacle 116. Obviously, the parts can be introduced directly or indirectly into a second finishing machine for a further or different finishing operation.

Figure 9:
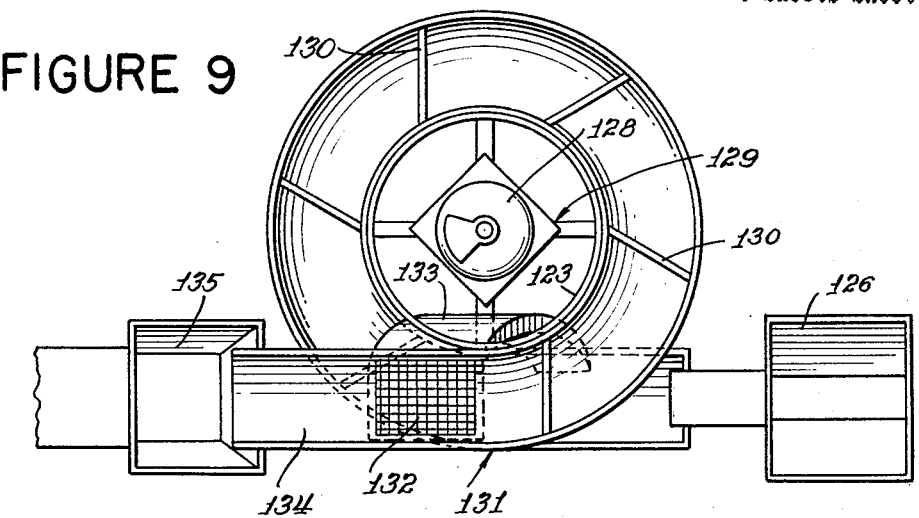
FIGURE 9 is a top view of a further embodiment utilizing a helical trough designed for continuous operation.
Figure 10:
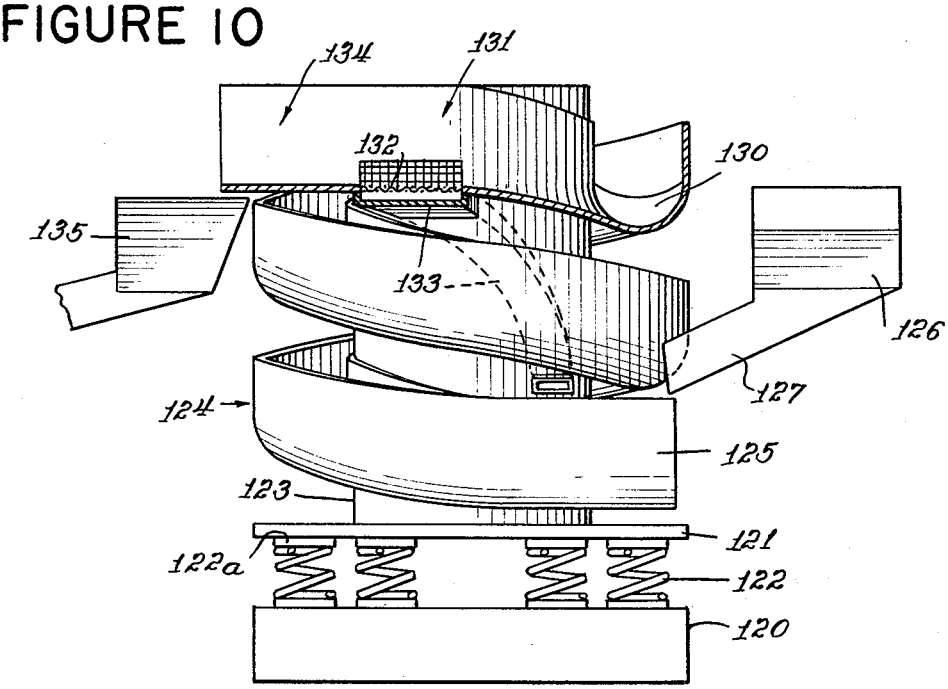
FIGURE 10 is a side elevation partly in cross-section of the apparatus shown in FIGURE 9.

FIGURES 9 and 10 show a finishing machine having a helical finishing chamber comprised of a plurality of loops. The extended length of the helical trough provides a sufficient contact time between the parts and the finishing medium so that the parts are completely finished when they reach the top of the trough. Consequently, this embodiment may be operated as a continuous process machine, with parts being continuously introduced at the receiving zone and discharged at the top of the apparatus. The bottom of the trough is again preferably arcuate, e.g., semi-cylindrical, in cross-section.

The apparatus of FIGURES 9 and 10 is mounted on a stationary base 120. A base plate 121 is spring-mounted on base 120 by means of helical springs 122, suitably affixed to base 120 and base plate 121 as by cups or plates 122a. A frame 123 affixed to base plate 121 supports a helical trough 124. The lower end of the trough is closed to form a receiving zone 125. The parts and finishing medium may be introduced into the receiving zone by means of hopper 126 having a reduced spout 127 communicating with receiving zone 125. A vibratory motor 128, so oriented that its shaft extends vertically, is affixed to trough 124 or to its frame 123 by means of suitable motor mounting brackets 129. When the vibratory motor is activated, parts and finishing medium are excited into orbital motion, the relative motion between the parts and finishing medium causing the surfaces of the parts to be finished. Additionally, the mass comprising parts and finishing medium travels slowly upwardly along the trough, due to out-of-phase rotation of the eccentric weights of the motor, which preferably rotates in the descending direction of the helical trough. The upward motion can be aided by the holding and directing effects of optional vanes or baffles 130 affixed at intervals to the interior surface of the trough. These are ordinarily required when using a motor with balanced eccentric weights. At the end of the trough is a separation zone 131 comprising separatory screen 132 located over an opening provided in the trough bottom. The mesh of the screen is selected so that finishing medium passes therethrough while parts are retained. After the finishing medium passes through the screen, it is returned by gravity to receiving zone 125, where it commences another finishing cycle with newly added parts. The finishing medium is guided from the screen 132 to the receiving zone 125 by means of a duct 133. The parts continue to the discharge zone 134 of the trough and are collected in a receptacle 135 or alternatively move to another operation as by an endless belt (not shown).

The helical trough apparatus illustrated by FIGURES 9 and 10 may be provided in any desired or convenient length and any desired pitch, within practical limitations, and may be of increasing or decreasing radii, e.g., be conical in nature. When the proper parameters are chosen, the parts will have the desired finish as they emerge from the discharge zone. One or more classification screens, not shown, may be utilized in conjunction with the return duct 133 to separate fines and finishing materials which has been worn down from that which is still useable, and to discard the spent finishing material and fines. Alternatively, a variable damper may be associated with the ductwork to direct the finishing material out of the device rather than permit its return to the receiving zone for another work cycle.

Figure 11:
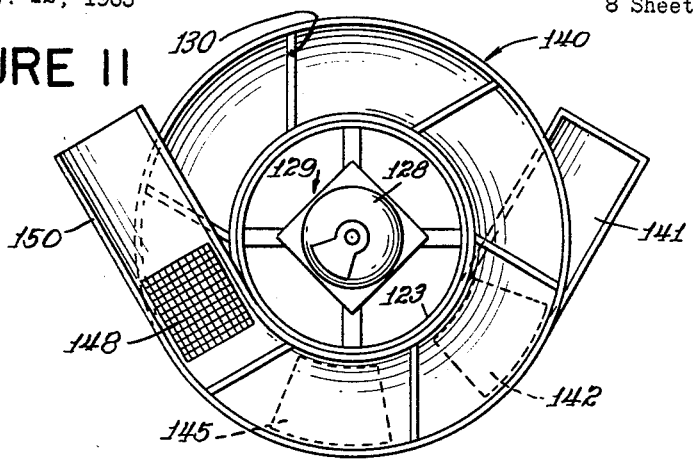
FIGURE 11 is a top view of a continuous multistage finishing machine utilizing a helical trough type abrading chamber.
Figure 12:
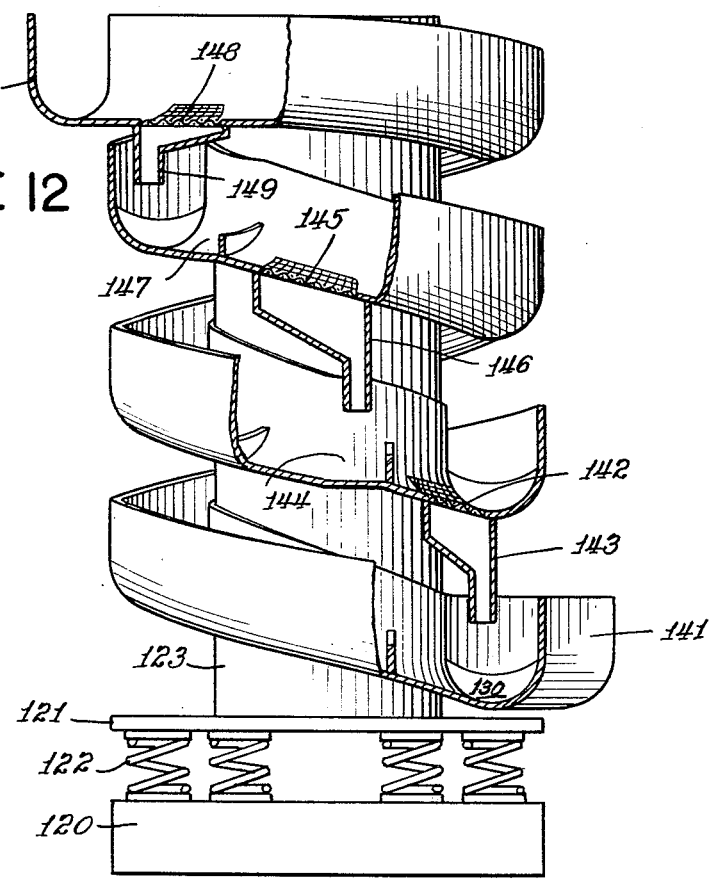
FIGURE 12 is a side elevation of the apparatus shown in FIGURE 11.

FIGURES 11 and 12 illustrate a multiple stage helical finishing machine. The basic structure of this machine is similar to that shown in FIGURES 9 and 10. In this case, instead of having a separatory screen only at the discharge end of the helical trough, one or more additional separatory screens are positioned at intermediate points in the helical trough. Consequently, when properly designed, a plurality of different grades of finishing media may be utilized within various individual zones of the trough. This makes it possible for the parts to undergo rough, intermediate, and fine finishing as they travel continuously upward along the trough, and to be discharged in finally finished form, without the necessity of stopping the apparatus and/or changing the grade of abrasive media employed for each type of finishing desired.

The multistage apparatus shown in FIGURES 11 and 12 comprises, in addition to the vibration permitting support and vibratory motor operatively associated therewith, as shown in FIGURES 9 and 10, a trough 140 having a closed lower end forming a first stage receiving zone 141. The trough again preferably has a bottom with an arcuate, e.g., semi-cylindrical, cross-section. This zone constitutes the beginning of the first stage and the finishing medium used is generally relatively coarse. With the vibratory motor energized, the parts and finishing medium are excited in an orbital path, and additionally move slowly up the trough due to the upward vibrational component, as in the previous embodiment. When the mixture reaches the screen 142, the first stage finishing material is returned to the receiving zone 141 by a duct 143. The parts continue along the trough and are carried into a second stage receiving zone 144 containing a medium grade finishing material. The mixture of parts and second grade finishing medium are then vibrated in the same orbital but upwardly advancing manner until they reach the second stage screen 145. Here the medium grade finishing material passes through the screen and returns to the second stage receiving zone 144 by means of duct 146. The parts continue on and enter the third stage receiving zone 147 where they are mixed with fine grade finishing medium and wherein the orbital and elevating finishing motion is continued until the mixture reaches the third stage screen 148, where the fine finishing medium passes through the screen and is returned by means of duct 149 to the third stage receiving zone 147. The parts continue along the trough to discharge zone 150, where they exit into a finished parts receptacle.

It will be recognized that fewer or more than three stages may be utilized in the multistage embodiment just described. Moreover, each stage may comprise more than one loop, when extensive finishing is to be carried out. The separatory screens may be placed in any suitable location, with return ducts of proper design being utilized to return finishing medium to the proper receiving zone. Once again, the trough may be of increasing or decreasing radii, e.g., conical in nature.

The vibratory motor in any helical trough embodiment, if suitably designed, may be placed at any operative position. Moreover, in order to cause the parts and finishing medium to move upward along the trough, the direction of rotation of the vibratory motor is preferably but not necessarily in the descending direction of the trough and, as previously stated, a motor having unbalanced or offset eccentric weights for out-of-phase rotation is preferred.

In addition, for classification of parts, in the event parts of different sizes are finished, screens of different sizes may be employed at different stages in the discharge zone of any illustrated embodiment, the smaller parts exiting through a smaller screen and being conveyed as by appropriate ductwork to a suitable receptacle, with the larger parts exiting by means of larger mesh screens and also being conveyed as by appropriate ductwork to suitable receptacles. In the simpler embodiments of the apparatus development, no ductwork will be required as the parts can pass directly through the screens into or onto receptacles.

In the more complex helical apparatus embodiments, the abrading or finishing material may also be separated from fines and used finishing material no longer suitable for return to the process by an appropriate location of screens, in or adjacent to the parts separation zone, whereby finishing material or fines of too small a diameter will pass through a first screen and exit from the device, while finishing material of a sufficient diameter for reuse in the process will pass over the screen and be returned by appropriate ductwork to the process at some suitable stage, for example to the starting or receiving zone in which the finishing process commences.

The method of the invention comprises vibrating a mixture comprising a part or work piece to be finished and a loose, comminuted, granular, or particulate solid finishing medium in a first zone to impart an orbital motion to cause said part to be finished and an upwardly directed component to cause the mass comprising parts and finishing material to travel upwardly to a second or separation zone, separating said finishing medium, returning it by means of gravity to said first zone, and discharging the finished part. In order to accomplish this result, the vibrations must impart a sufficiently orbital motion to the mass for finishing of the parts and, for elevation, must impart a vertical component to the direction of travel of the said mass. In this manner the mass of finishing material and parts to be finished are caused to achieve a vertical elevation, and to flow into a zone in which separation of parts from finishing material, whether by gravity means such as employing a foraminous member or by magnetic means, can be readily effected. After separation, the finishing medium is returned to the first zone, where it may be reemployed for further finishing, by means of gravity. This may be conveniently accomplished by suitable ducts or chutes, whether the separation is accomplished by means of a foraminous member or by magnetic means, the only consideration being that the finishing material should be returned to the finishing zone for further use in finishing after separation of the finished parts. The finished parts in turn are discharged from the device or, in the event that further finishing is required, they may be returned to the finishing zone in the same manner as the finishing material, eventually to be discharged from the device after a suitable degree of finishing has been effected thereon. The novel process of the invention is independent of any apparatus and indeed may be performed in any number of different apparatus, some of which being particularly suitable for carrying out the process of the present invention are disclosed and claimed herein.

Any suitable vibration generating means may be used in accord with the process and apparatus of the present invention. In the drawings, a vibratory motor is shown as fixedly secured to a housing by means of a motor mounting bracket or the like. The vibration generating means may comprise any power means including an electric as well as a fluid motor, and may be of the rotary type, the hydraulic type, the pneumatic type, or a prime mover. If the motor is of the rotary type, conventional eccentric weights are ordinarily mounted to the motor shaft for generating orbital vibrations which are imparted to the housing. Alternatively, eccentric weights can be secured to the housing and the motor operatively engaged with the eccentrics but not secured to the housing. Neither the motor nor the eccentrics need be secured to the housing but only operatively associated therewith, although it is preferred to have the vibration-generating means secured to the housing to be vibrated thereby. For the chamber type finishing machines exemplified by FIGURES 1–6, a vibratory motor with balanced eccentric weights capable of in-phase rotation is preferred, since greatest efficiency is achieved by disposing the vibratory motor with respect to the bottom of the finishing chamber, which is preferably arcuate, e.g., semi-cylindrical or the like, so that each alternating wave of energy generated by the vibratory motor moves the mass of parts and finishing material in a substantially orbital motion normal to an axis theoretically located at the center of the circle of which the bottom of the finishing chamber is a circumferential arc. For the helical type devices, a vibratory motor having unbalanced or offset eccentric weights capable of out-of-phase rotation is preferred. Several vibratory motors suitably mounted can be employed to produce the desired out-of-phase effect. At any rate, by imparting suitable vibrations to the finishing chamber or trough, the mass of finishing material and parts therein is preferably moved in an orbital manner. These orbital vibrations or alternating waves of energy substantially increase the action between the finishing material and the surface of the unfinished parts, much more than if the finishing material and unfinished parts were tumbled. Because of the vertical component of the vibrations, the mass of finishing material and parts, moreover, moves to a position which is vertically elevated with respect to its starting position, which is an essential feature according to the process and apparatus of the present invention.

It can be readily seen that the present invention provides a novel finishing machine wherein the parts and finishing medium are automatically transferred from the finishing chamber to a separation zone without the necessity for tilting or rotating the device or the finishing chamber thereof. The parts and finishing media are automatically separated, the parts discharged, and the finishing media returned to the starting point by the force of gravity. Moreover, various embodiments of the invention are suitable for either batch or continuous operation, as well as multiple stage continuous operation in which the need for interrupting the finishing process to transfer or introduce various grades of finishing material is eliminated.

For separation purposes, according to the invention, a screen or other foraminous member may be employed, which may be, depending upon the apparatus utilized, either fixed in position or moveable into position, as illustrated by the drawings. A magnetic separation means may be employed as well as a foraminous member, especially in those cases where the finishing material is non-metallic in nature and the parts being finished are of a ferrous or other metal material subject to magnetic attraction.

When magnetic separation is employed, the foraminous member in the embodiments shown herein may be replaced partially throughout its length with a non-interfering plate, preferably of non-metallic material, to enable the magnetic separator, in the form of a vibratable bar or an endless belt or the like, to attract the metallic parts or work pieces as they pass over the plate, the non-metallic finishing material passing over the plate and falling off the end thereof into a suitable duct to be returned to a receiving zone for a further finishing cycle.

When a "screen" is used in a structure of the invention, other types of foraminous members may be substituted therefor and will be found equally operative. The term "foraminous member" as used herein denotes a member having openings or perforations for classification of parts and finishing media, for example, a grate or screen of any type illustratively having wires or rods either parallel or at an angle to each other, whether or not reticulated.

By "finishing material" or "finishing media" or "medium," as these terms are used herein, it is intended to include loose, comminuted, granular, or particulate, and in any event, solid finishing materials of the type which are presently employed in the trade and any others of a similar nature. Although liquid finishing material may be used in conjunction with the solid finishing material, these are considered to be ancillary for purposes of the present invention which in all cases employs at least some solid finishing medium for the process of the invention. Moreover, the terms first set forth in this paragraph are used herein generally to designate such solid materials which are used to impart all types of finishes including those finishes acquired with abrading materials as well as with polishing materials, and "polishing" is to be considered in its usual sense as one species of "finishing."

Figure 13:
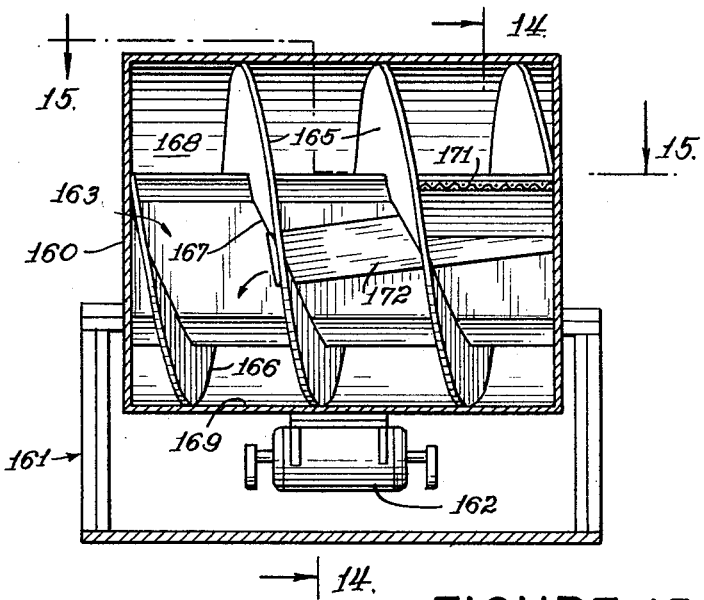
FIGURE 13 is a vertical section of another embodiment of the invention.
Figure 14:
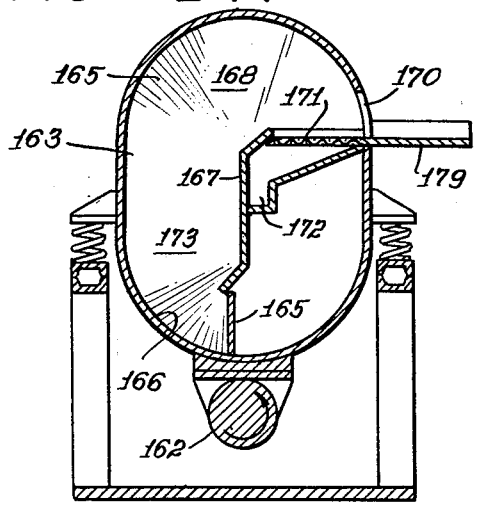
FIGURE 14 is a cross section taken at the line 14—14 of FIGURE 13.
Figure 15:
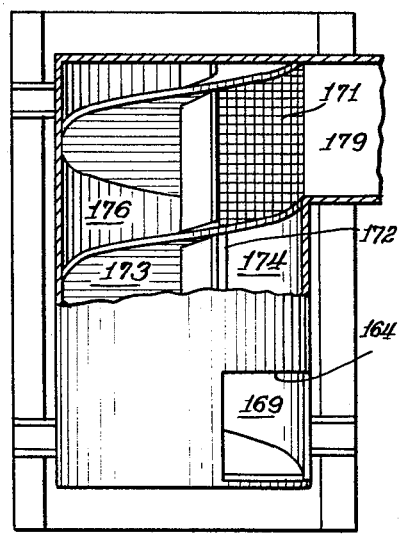
FIGURE 15 is a horizontal section taken at the line 15—15 of FIGURE 13.

The finishing machine shown in FIGURES 1–3 may be modified to provide a continuous operation machine, as shown in FIGURES 13–15. In the continuous operation machine the housing 160, supporting structure 161, and vibratory motor 162 may be substantially the same as shown in FIGURES 1–3. The transverse septum 163 may also be similar to that shown in FIGURES 1–3. However, the intake receptacle 164 through which the chamber is charged is confined to one end of the housing. A sheet-form auger-like helical baffle 165 substantially perpendicular to the plane of the septum 163 and to the cylindrical walls of the housing 160 is affixed with one edge 166 engaging the housing wall and the other edge 167 engaging the vertical septum. The helical baffle cooperates with the chamber walls and the septum to define a helical chamber 168 starting at the intake receptacle 164 at one end and terminating at an exit opening 170 at the other end of the housing, adjacent which exit opening a foraminous member or baffle 171 is placed to receive the abrading mixture as it is forced over the top of the septum. A suitable duct 172 is provided to return the finishing material which is separated from the parts to the charging or receiving zone at the opposite end of the housing where it is again available for a new charge of parts.

In operation the parts and finishing medium are charged through the intake receptacle 164 into one end of the helical chamber 168. When proper vibratory movement is imparted to the housing, the finishing process begins and the mixture comprising the parts and finishing media slowly rises in the ascending chamber 173, as described with regard to the apparatus of FIGURES 1–3. After clearing the top of the vertical septum, the mixture falls into the descending portion 174 of the second loop of the helical chamber. The mixture continues and rises in the ascending portion 176 of the second loop, continues over the vertical septum and falls into the descending chamber of the third loop. In this manner the mixture gradually works its way along the helical chamber and eventually emerges at the end thereof onto a foraminous member or baffle 171 placed at or below the top edge of the vertical septum, as shown in FIGURES 13–15. The parts are discharged through a suitable discharge opening 179 and the finishing medium passes through the foramina and is returned to the receiving end of the helical chamber by means of gravity along a suitably designed duct 172, preferably designed to communicate with the descending chamber at the receiving end of the housing. Magnetic separatory means may again replace the foraminous member.

This embodiment of the invention permits parts to be continuously introduced into the finishing machine and the finished parts to be continuously discharged without the need for stopping the apparatus. Moreover, the contact time of the parts within the apparatus may be controlled to a degree by the rate at which the parts and/or medium are introduced.

Figure 16:
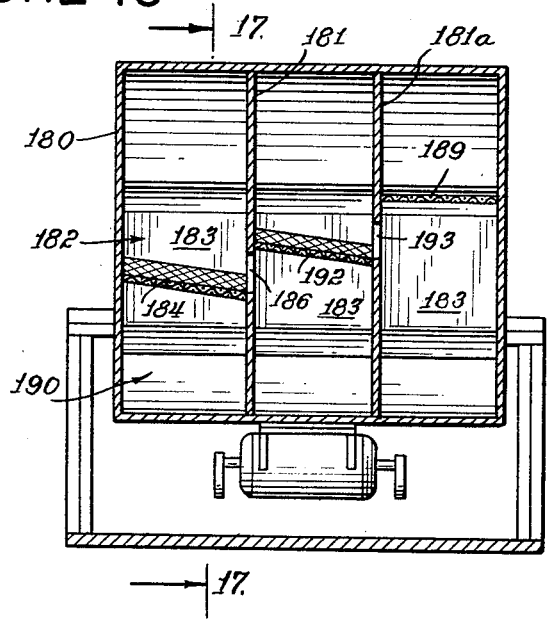
FIGURE 16 is a vertical section of still another embodiment of the invention taken at the line 16—16 of FIGURE 17.
Figure 17:
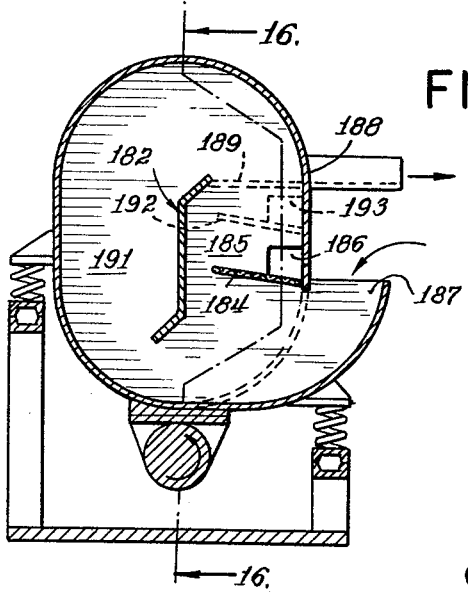
FIGURE 17 is a cross section taken at the line 17—17 of FIGURE 16.

The finishing machine of FIGURES 1–3 may also be modified, as shown in FIGURES 16 and 17, to produce a multiple stage finishing machine in which parts may be subjected to coarse, intermediate and fine finishing materials, as well as various grades therebetween, without the need for stopping and emptying the machine for changes of finishing material. The multiple stage machine utilizes a housing 180 similar to that shown in FIGURES 1–3. Additionally, one or more transverse partitions 181 and 181a are inserted within the housing, dividing the housing into a plurality of compartments arranged side by side. Alternatively, a series of complete housings can be secured together side by side. The vertical septum 182 is placed in substantially the same position as in FIGURES 1–3. However, for convenience it may be provided in the form of a plurality of longitudinal or vertical strips 183 which may respectively either pass through or be affixed to the transverse partitions. In each compartment a separating means in the form of a foraminous member 184, 189, and 192 is provided in the descending chamber 185 at a point at or below the upper edge of the vertical septum 182, just as in FIGURES 1–3. An opening 186 or 193 is provided in the transverse partition separating the one compartment from the next adjacent compartment at substantially the level of the foraminous member, and preferably near the outer wall of the housing, to permit parts to be transferred from the foraminous member to the descending chamber of the following compartment. An intake receptacle 187 is provided at the first compartment and an outlet opening 188 is provided at the last compartment, together with a foraminous member 189 or magnetic separatory means for separating the finishing material from the parts and discharging the parts.

In operation each separate compartment may be filled with a different grade of finishing material, e.g., beginning with coarse and proceeding to fine. The parts are charged into the first compartment 190. When the housing is properly vibrated, the surfaces of the parts are continually subjected to abrading and the entire mixture comprising the parts and finishing material slowly rises in the ascending chamber 191, as in the case of the apparatus of FIGURES 1–3. As the mixture rises over the top of the vertical septum in the first compartment, it falls into the descending chamber and onto the first foraminous member 184. Here the finishing material falls through and returns to the bottom of the first compartment. The parts continue through the opening 186 of the transverse compartment wall and fall into the bottom of the next compartment where the process begins again with a finer grade of finishing material. The mixture continues into the ascending chamber of the second compartment and over the top of the vertical septum into the descending chamber of the second compartment and onto a second separating means in the form of a foraminous member 192 where the finishing material is separated and permitted to fall to the bottom of the second compartment, while the parts are caused to pass through an opening 193 of the second transverse partition wall 181a and into a third compartment where the process is continued with still a finer grade of finishing material. As many compartments and different grades of finishing material as desired may be utilized. Moreover, if it is desired that the parts engage in more than one cycle with each grade of finishing material, the separatory means, e.g., foraminous member, in each or any stage may be temporarily retracted so that both the parts and the finishing medium fall to the bottom and are subjected to additional cycles. A foraminous member 189 or magnetic separatory means at the last compartment intercepts the parts and discharges them, while permitting the finishing material to return to the bottom of the last compartment for finishing succeeding parts, as already indicated for other embodiments.

This embodiment of the present invention enables the parts to be subjected to various grades of finishing material in a single operation, and without the need for stopping the apparatus to discharge the material and recharge again with a different grade of finishing medium. Alternatively, the various compartments of this embodiment may be charged with the same grade of abrasive medium and the apparatus utilized for continuous operation.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

I claim:

1. A method for finishing a part which comprises introducing said part and a finishing medium into a first zone, subjecting the mixture comprising said part and said finishing medium to vibration to cause said part to be finished and said mixture to travel upwardly to a second zone, separating said finishing medium and returning it by means of gravity to said first zone, and discharging said part.

2. A method for finishing a part which comprises introducing said part and a finishing medium into a first zone, subjecting the mixture comprising said part and said medium to a finishing cycle which comprises vibrating said mixture to cause said part to be finished and said mixture to travel upwardly to an elevated zone, returning said mixture to said first zone by gravity, repeating the finishing cycle until said part is finished and said mixture is in said elevated zone, seperating said finishing medium and returning it to said first zone by means of gravity, and discharging said part.

3. A method for finishing a part which comprises introducing said part and a finishing medium into a receiving zone, subjecting the mixture comprising said part and said finishing medium to vibration to cause said part to be finished and said mixture to travel in an upwardly directed helical path to an elevated separation zone, separating said finishing medium and returning it to said receiving zone by means of gravity, and discharging said part.

4. A method for finishing a part which comprises introducing said part and a finishing medium into a receiving zone, subjecting the mixture comprising said part and said finishing medium to a finishing cycle which comprises vibrating said mixture to cause said part to be finished and said mixture to travel in an upwardly directed helical path to an elevated zone, returning said mixture to said receiving zone by the force of gravity, repeating the finishing cycle until said part is finished and said mixture is in said elevated zone, separating said finishing medium and returning it to said receiving zone by means of gravity, and discharging said part.

5. A multistage method for finishing a part which comprises introducing said part and a finishing medium into a first receiving zone, subjecting the mixture comprising said part and said finishing medium to vibration to cause said part to be finished and said mixture to travel in an upwardly directed helical path to a first elevated separation zone, separating said finishing medium and returning it to said first receiving zone by means of gravity, introducing said part into a second receiving zone containing a finishing medium of a different grade and subjecting the mixture comprising said part and said different grade finishing medium to said vibration causing said part to be finished to a further degree and said mixture to travel in an upwardly directed helical path to a second elevated separation zone, separating said different grade finishing medium and returning it to said second receiving zone by means of gravity, and discharging said part.

6. A finishing machine for finishing the surface of a part comprising a housing mounted for vibration defining a finishing chamber comprising a downwardly positioned receiving zone and an upwardly positioned separation zone, an opening provided in said housing adapted to receive said part and a finishing medium, vibratory means operatively associated with said housing and oriented for subjecting the mixture comprising said part and said finishing medium to vibration to cause finishing of said part and to cause said mixture to travel upwardly to said separation zone, means in said separation zone for separating said finishing material from said part while said separation zone is upwardly positioned, means for guiding said finishing material back to said receiving zone, and means for discharging said part.

7. A finishing machine for finishing the surface of a part comprising a housing mounted for vibration defining a finishing chamber comprising a downwardly positioned receiving zone and an upwardly positioned separation zone, a vertically oriented septum in said housing dividing said chamber into a pair of vertical chambers communicating with each other at both their top and bottom including an ascending chamber and a descending chamber, an opening provided in said housing communicating with said finishing chamber adapted to receive said part and a finishing medium and discharge said part, vibratory means operatively associated with said housing comprising a motor having its shaft oriented in a generally horizontal direction, said vibratory means being adapted to subject the mixture comprising said part and said finishing medium to vibration to cause finishing of said part, and to cause said mixture to rise in said ascending chamber and to fall in said descending chamber to be returned to said receiving zone, and separation means adapted to be inserted in said separation zone for separating said finishing medium from said part and permitting it to fall into said receiving zone, and means for discharging said part.

8. A finishing machine according to claim 7 wherein the lower edge of said septum is angled toward said ascending chamber and the upper edge of said septum is turned toward said descending chamber.

9. A finishing machine according to claim 7 wherein said separation means is a foraminous member.

10. A finishing machine according to claim 7 additionally having means for introducing a liquid into said abrading chamber, and means for removing said liquid therefrom.

11. A finishing machine according to claim 7 wherein the bottom of said housing has an arcuate cross-section.

12. A finishing machine according to claim 7 wherein the lower portion of said septum has an arcuate cross-section.

13. A finishing machine according to claim 7 wherein said separation means comprises a screen hinged at its forward edge adapted to be opened during a finishing operation to permit both said part and said finishing medium to fall through the opening provided thereby and to return to said receiving zone, and to be closed during a separation operation for separating said finishing medium and discharging said part.

14. A housing for a vibratory finishing machine adapted to be mounted for vibration and defining a finishing chamber comprising a downwardly positioned receiving zone and an upwardly positioned separation zone, an opening provided in said housing adapted to receive a part to be finished and finishing medium, said housing being adapted to be vibrated when mounted for subjecting the mixture comprising said part and said finishing medium to vibration for finishing of said part and for moving said mixture upwardly to said separation zone, means in said separation zone for separating said finishing material from said part while said separation zone is maintained at its upward position, means for returning said finishing material to said receiving zone, and means for discharging said part.

15. A housing for a vibratory finishing machine for finishing the surface of a part with finishing material comprising a housing adapted to be mounted for vibration defining a finishing chamber comprising a downwardly positioned receiving zone and an upwardly positioned separation zone, a vertically oriented septum in said housing dividing said chamber into a pair of vertical chambers communicating with each other at both their top and bottom including an ascending chamber and a descending chamber, an opening provided in said housing communicating with said finishing chamber adapted to receive said part and said finishing medium and discharge said part, said housing being adapted to be vibrated when mounted to subject the mixture comprising said part and said finishing medium to vibration to cause finishing of said part, and to cause said mixture to rise in said ascending chamber and to fall in said descending chamber to be returned to said receiving zone, and separation means adapted to be inserted in said separation zone for separating said finishing medium from said part and permitting said finishing medium to fall into said receiving zone, and means for discharging said part.

16. A housing according to claim 15 wherein the lower edge of said septum is angled toward said ascending chamber and the upper edge of said septum is turned toward said descending chamber.

17. A housing according to claim 15 wherein said separating means is a foraminous member.

18. A housing according to claim 15 having a bottom which is arcuate in cross-section.

19. A housing according to claim 15 wherein the lower portion of said septum has an arcuate cross-section.

20. A housing for a vibratory finishing machine for finishing the surface of a part comprising a housing adapted to be mounted for vibration defining a finishing chamber comprising a downwardly positioned receiving zone and an upwardly positioned separation zone, a vertically oriented septum in said housing dividing said chamber into a pair of vertical chambers communicating with each other at both their top and bottom including an ascending chamber and a descending chamber, an opening provided in said housing communicating with said finishing chamber adapted to receive said part and a finishing medium and discharge said part, vibratory means operatively associated with said housing comprising a motor having its shaft oriented in a generally horizontal direction, said vibratory means being adapted to subject the housing when mounted and the mixture comprising said part and said finishing medium in said housing to vibration to cause finishing of said part and to cause said mixture to rise in said ascending chamber and to fall in said descending chamber to be returned to said receiving zone, and separatory means adapted to be inserted in said separation zone for separating said finishing medium from said part and permitting said finishing medium to fall into said receiving zone, and means for discharging said part.

21. A housing for a vibratory finishing machine for finishing the surface of a part comprising a housing adapted to be mounted for vibration defining a finishing chamber comprising a downwardly positioned receiving zone and an upwardly positioned separation zone, a vertically oriented septum in said housing dividing said chamber into a pair of vertical chambers communicating with each other at both their top and bottom including an ascending chamber and a descending chamber, an opening provided in said housing communicating with said finishing chamber adapted to receive said part and a finishing medium and discharge said part, said housing being adapted to be vibrated when mounted to subject the mixture comprising said part and said finishing medium to vibration to cause finishing of said part, and to cause said mixture to rise in said ascending chamber to fall in said descending chamber to be returned to said receiving zone, said housing adapted to be utilized in conjunction with separation means when inserted in said separation zone for separating said finishing medium from said part and permitting said finishing medium to fall into said receiving zone, and means for discharging said part.

22. A housing according to claim 21 wherein the lower edge of said septum is angled toward said ascending chamber and the upper edge of said septum is turned toward said descending chamber.

23. A housing according to claim 21 having a bottom which is arcuate in cross-section.

24. A housing according to claim 21 wherein the lower portion of said septum has an arcuate cross-section.

25. A finishing machine for finishing the surface of a part comprising a housing mounted for vibration defining a vertically oriented helical finishing chamber having a zone at its lower level adapted to receive said part and a separation zone at an upper level, vibratory means operatively associated with said housing for subjecting a mixture comprising said part and a finishing material to vibration to cause finishing of said part and to cause said mixture to travel upwardly along said helical chamber, means provided in said separation zone for separating said finishing material and part, and means for discharging said part, said finishing machine being arranged to enable said separated material to return to a lower zone of said finishing chamber by means of gravity.

26. A finishing machine for finishing the surface of a part comprising a housing mounted for vibration defining a vertically oriented helical finishing chamber having a receiving zone at its lower level and a separation zone at an upper level, vibratory means operatively associated with said housing for subjecting a mixture comprising said part and a finishing material to vibration to cause finishing of said part and to cause said mixture to travel upwardly along said helical chamber, means provided in said separation zone for separating said finishing material and parts, means for discharging said parts, and duct means enabling said separated material to be returned to said receiving zone by means of gravity.

27. A finishing machine according to claim 26 wherein said chamber comprises a trough, the bottom of which has an arcuate cross-section.

28. A finishing machine according to claim 26 wherein said means for separating said finishing material comprises a foraminous member having a mesh adapted for passing said finishing material but retaining said part.

29. A finishing machine for finishing the surface of a part comprising a housing mounted for vibration and defining a vertically oriented helical finishing chamber having a zone at its lower level adapted to receive said part and a separation zone at an uper level, vibratory means operatively associated with said housing comprising a motor positioned with its shaft oriented generally vertically for subjecting a mixture comprising said part and a finishing material to vibration to cause finishing of said part and to cause said mixture to travel upwardly along said chamber, said finishing machine being arranged to enable said mixture to return by means of gravity, to a lower zone of said finishing chamber for recycling, separation means adapted to be inserted for separating said finishing material from said part and permitting said material to return to said lower zone, and means for discharging said part.

30. A finishing machine for finishing the surface of a part comprising a housing mounted for vibration and defining a vertically oriented helical finishing chamber having a receiving zone at its lower level and a separation zone at an upper level, vibratory means operatively associated with said housing comprising a motor positioned with its shaft oriented generally vertically for subjecting a mixture comprising said part and a finishing material to vibration to cause finishing of said part and to cause said mixture to travel upwardly along said chamber, an opening provided in said separation zone with associated duct means for returning said mixture by means of gravity to said receiving zone for recycling, separation means adapted to be inserted over the opening in said separation zone when said part is finished for separating said finishing material from said part and returning it to said receiving zone by means of gravity, and means for discharging said part.

31. A finishing machine according to claim 30 wherein said chamber comprises a trough, the bottom of which has an arcuate cross-section.

32. A finishing machine according to claim 30 wherein said means for separating said finishing material comprises a foraminous member having a mesh adapted for passing said finishing medium but retaining said part.

33. A multiple stage finishing machine for finishing the surface of a part comprising a housing mounted for vibration and defining a vertically oriented helical finishing chamber having a receiving zone at its lower level and a plurality of separation zones, one at its upper level and the remainder intermediately disposed, vibratory means operatively associated with said housing comprising a motor positioned with its shaft oriented generally vertically for subjecting mixtures comprising said part and successive grades of finishing media to vibration to cause finishing of said part and to cause said mixtures to travel upwardly along said chamber, each stage comprising a lower positioned receiving zone, an upper positioned separation zone, and means arranged to return the separated finishing material from the separation zone to its respective receiving zone, and discharge means provided adjacent the last separation zone for discharging said part.

34. A finishing machine according to claim 33 wherein said housing comprises a trough, the bottom of which has an arcuate cross-section.

35. A finishing machine according to claim 33 wherein each of said means for separating said finishing medium comprises a foraminous member having a mesh adapted for passing said finishing medium but retaining said part.

36. A multiple stage finishing machine for finishing the surface of a part comprising a housing mounted for vibration, a vertically oriented septum and at least one transverse partition mounted in said housing, the outer edge of said partition engaging said housing wall and its center engaging said septum, said housing, said septum and said partition cooperating to define a plurality of compartments oriented side by side, each comprising vertical chambers communicating with each other at both their top and bottom including an ascending chamber an a descending chamber, an opening provided in said housing communicating with the first of said compartments adapted to receive said part and a finishing medium, vibratory means operatively associated with said housing comprising a motor having its shaft oriented in a generally horizontal direction, said vibratory means being adapted to subject the mixture comprising said part and said finishing medium to vibration to cause said part to be finished and to cause said mixture to rise in each of said ascending chambers and fall in each of said descending chambers, separatory means provided for separating the finishing medium of each said compartment from said part and permitting said medium to fall to the bottom of said compartment, and transfer means for transferring said part from each compartment to the following compartment, said last compartment having means for discharging said part.

37. A finishing machine of claim 36 wherein said separatory means is a foraminous member.

38. A finishing machine of claim 36 wherein said transfer means is an opening in said partition cooperating with said separatory means.

39. A finishing machine of claim 38 wherein said separatory means is a foraminous member.

40. A housing for a multiple stage finishing machine for finishing the surface of a part comprising a housing adapted to be mounted for vibration, a vertically oriented septum and at least one transverse partition mounted in said housing, the outer edge of said partition engaging said housing wall and its center engaging said septum, said housing, said septum and said partition cooperating to define a plurality of compartments oriented side by side, each comprising vertical chambers communicating with each other at both their top and bottom including an ascending chamber and a descending chamber, an opening provided in said housing communicating with the first of said compartments adapted to receive said part and a finishing medium, said housing when mounted being adapted to be vibrated to subject the mixture comprising said part and said finishing medium therein to vibration to cause said part to be finished and to cause said mixture to rise in each of said ascending chambers and fall in each of said descending chambers, and being adapted for use in conjunction with separatory means for separating the finishing medium of each said compartment from said part and permitting said medium to fall to the bottom of said compartment, and transfer means in said housing for transferring said part from each compartment to the following compartment, said last compartment having means for discharging said part.

41. A housing of claim 40 wherein said transfer means is an opening in said partition adapted to cooperate with said separatory means.

42. A continuous process finishing machine for finishing the surface of a part comprising a housing mounted for vibration, a vertically oriented septum mounted in said housing, and a substantially sheet-form helical baffle mounted in said housing with its outer edge engaging said housing wall and its inner edge engaging said septum, said housing, said septum and said helical baffle cooperating to define a helical chamber, an opening provided at the receiving zone of said housing for receiving said part and a finishing medium, and a discharge opening provided at the other end of said housing for discharging said part, vibratory means operatively associated with said housing comprising a motor having its shaft oriented in a generally horizontal direction, said vibratory means being adapted to subject the mixture comprising said part and said finishing medium to vibration to cause said part to be finished and to cause said mixture to travel along said helical chamber, to rise in the ascending portions thereof and fall in the descending portions thereof, and separatory means positioned adjacent said discharge opening adapted to separate said finishing medium from said part and discharge said part.

43. A finishing machine of claim 42 wherein said separatory means is a foraminous member.

44. A continuous process finishing machine for finishing the surface of a part comprising a housing mounted for vibration, a vertically oriented septum mounted in said housing, and a substantially sheet-form helical baffle mounted in said housing with its outer edge engaging said housing wall and its inner edge engaging said septum, said housing, said septum and said helical baffle cooperating to define a helical chamber, an opening provided at the receiving zone of said housing for receiving said part and a finishing medium, and a discharge opening provided at the other end of said housing for discharging said part, vibratory means operatively associated with said housing comprising a motor having its shaft oriented in a generally horizontal direction, said vibratory means being adapted to subject the mixture comprising said part and said finishing medium to vibration to cause said part to be finished and to cause said mixture to travel along said helical chamber, to rise in the ascending portions thereof and fall in the descending portions thereof, and separatory means positioned adjacent said discharge opening adapted to separate said finishing medium from said part and discharge said part, and duct means for returning said finishing medium to said receiving zone.

45. A finishing machine of claim 44 wherein said separatory means is a foraminous member.

46. A housing for a continuous process finishing machine for finishing the surface of a part comprising a housing adapted to be mounted for vibration, a vertically oriented septum mounted in said housing, and a substantially sheet-form helical baffle mounted in said housing with its outer edge engaging said housing wall and its inner edge engaging said septum, said housing, said septum and said helical baffle cooperating to define a helical chamber, an opening provided at the receiving zone of said housing for receiving said part and a finishing medium, and a discharge opening provided at the other end of said housing for discharging said part, said housing when mounted being adapted to be vibrated to subject the mixture comprising said part and said finishing medium therein to vibration to cause said part to be finished and to cause said mixture to travel along said helical chamber, to rise in the ascending portions thereof and fall in the descending portions thereof, and adapted for use in conjunction with separatory means positioned adjacent said discharge opening for separation of said finishing medium from said part.

47. A housing for a continuous process finishing machine for finishing the surface of a part comprising a housing adapted to be mounted for vibration, a vertically oriented septum mounted in said housing, and a substantially sheet-form helical baffle mounted in said housing with its outer edge engaging said housing wall and its inner edge engaging said septum, said housing, said septum and said helical baffle cooperating to define a helical chamber, an opening provided at the receiving zone of said housing for receiving said part and a finishing medium, and a discharge opening provided at the other end of said housing for discharging said part, said housing when mounted adapted to be vibrated to subject the mixture comprising said part and said finishing medium therein to vibration to cause said part to be finished and to cause said mixture to travel along said helical chamber, to rise in the ascending portions thereof and fall in the descending portions thereof, and separatory means positioned adjacent said discharge opening adapted to separate said finishing medium from said part and discharge said part.

48. A housing of claim 47 wherein said separatory means is a foraminous member.

49. A housing of claim 47 including duct means for returning said finishing medium to said receiving zone.

References Cited by the Examiner
UNITED STATES PATENTS

| | | | |
|---|---|---|---|
| 830,349 | 9/06 | Meurer | 51—163 |
| 2,443,819 | 6/48 | Fisher | 51—14 |

LESTER M. SWINGLE, *Primary Examiner.*

J. SPENCER OVERHOLSER, *Examiner.*

Notice of Adverse Decision in Interference

In Interference No. 94,983 involving Patent No. 3,161,993, G. W. Balz, FINISHING APPARATUS AND METHOD, final judgment adverse to the patentee was rendered Apr. 25, 1968, as to claims 3, 4, 25, 26, 28, 29, 30 and 32.

[*Official Gazette March 17, 1970.*]